United States Patent Office 3,526,116
Patented Sept. 1, 1970

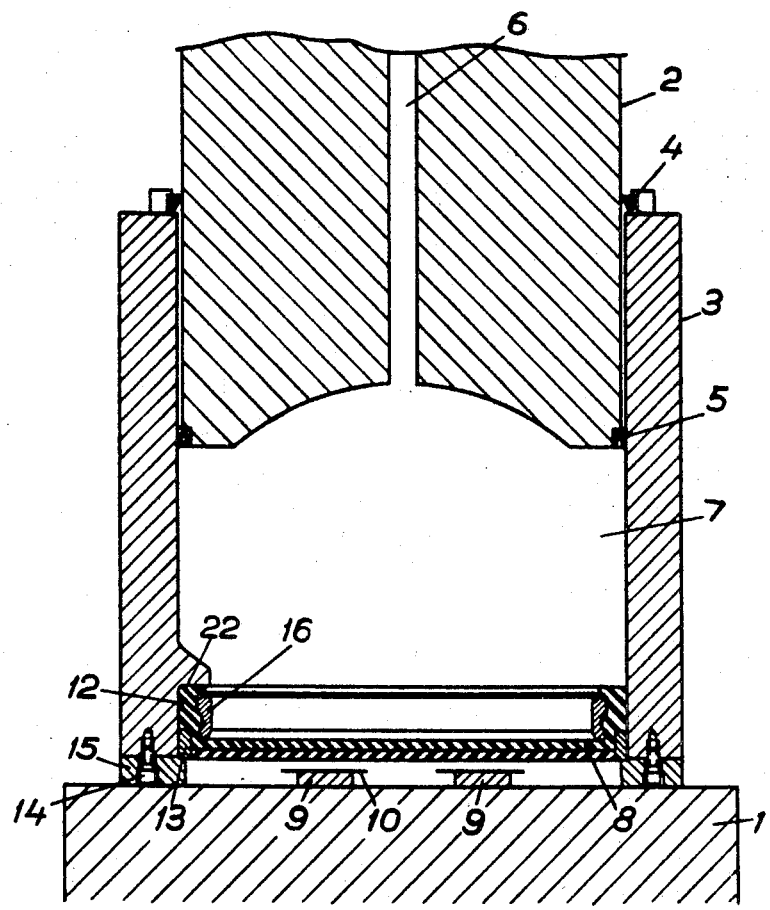

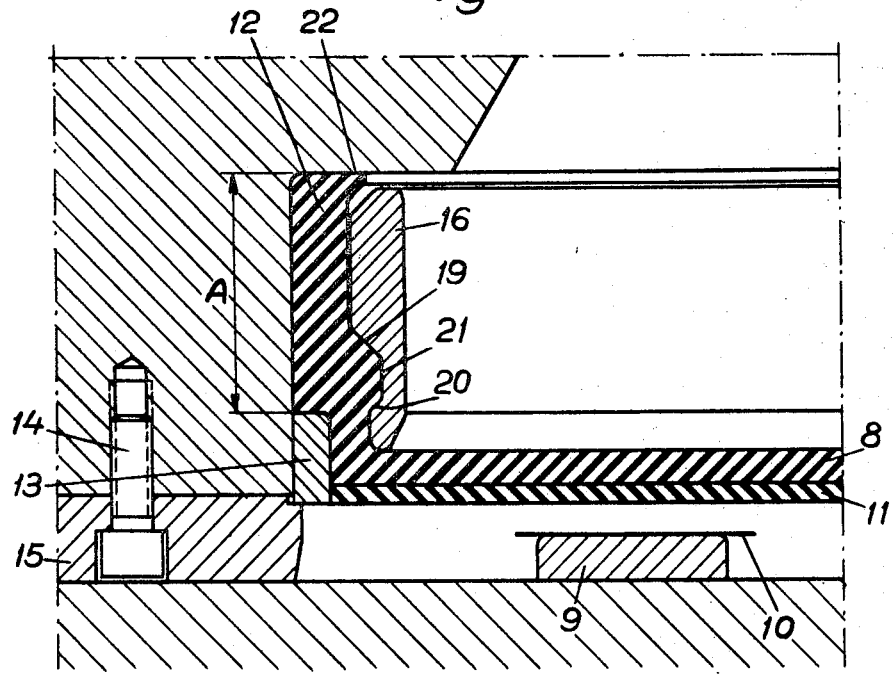
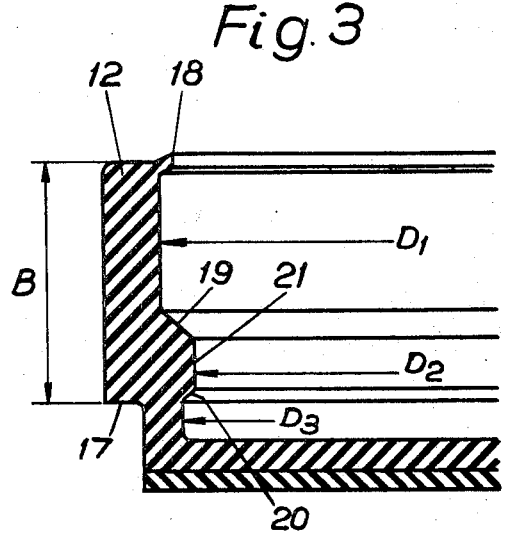

3,526,116
PRESS FOR SHAPING SHEET METAL BY MEANS OF MEMBRANES
Torstein Landa, Harry Claesson, and Pertti Syväkari, Vasteras, Sweden, assignors to Allmänna Svenska Elektriska Aktiebolaget, Vasteras, Sweden, a corporation of Sweden
Filed Feb. 29, 1968, Ser. No. 709,340
Claims priority, application Sweden, Mar. 3, 1967, 2,906/67
Int. Cl. B21d 22/12
U.S. Cl. 72—63
1 Claim

ABSTRACT OF THE DISCLOSURE

In a press for shaping sheet material by a diaphragm arranged in a pressure cylinder, the diaphragm has a cylindrical attachment part which is clamped between a shoulder on the cylinder and a holding ring. This part has an internal collar which is engaged by a support ring inside the attachment part. The support ring is shorter than the attachment part.

BACKGROUND OF THE INVENTION

The present invention relates to a press for shaping sheet material by means of a diaphragm activated by a pressure medium and pressing the sheet material against a die-member which gives the sheet material the desired shape. Presses of this type have been used for a long time within the aviation industry to shape frames and the like, but are also suitable for deep drawing sheet material into complicated sections.

FIELD OF THE INVENTION

The diaphragm must of course be attached in the cylinder in such a way that complete sealing is obtained. With the high fluid pressures which are normally used it is difficult with simple means to effect an attachment which is satisfactory in every respect. The diaphragm is usually shaped so as to have an annular cylindrical attachment part with an external annular ridge and the cylinder is shaped with an annular slot fitting this ridge. Inside the annular part of the diaphragm is an expanding ring opposite said ridge. After insertion the ring is forced to expand so that the annular part is pressed with considerable force against the inner surface of the cylinder. A great disadvantage with this type of attachment is that the attachment means is inside the cylinder and must be taken out of the press stand when the diaphragm is to be replaced. This disadvantage is particularly noticeable in presses operating with very high pressure since in these presses the cylinder and other machine elements which have to be dismantled are very heavy. In order to simplify the exchange of diaphragms in certain cases the diaphragm is mounted in a casing which is insertable into the cylinder. In this embodiment an additional sealing is required between the casing and the cylinder. Particularly with very high pressure this additional sealing is a great disadvantage.

SUMMARY OF THE INVENTION

By means of the invention a diaphragm attached directly in the cylinder can be replaced while the pressure cylinder is in position in the press. This is achieved by placing all the attachment members outside the pressure chamber and easily accessible. According to the invention the diaphragm is shaped with a cylindrical attachment part having an outer annular stop nearest the diaphragm for a locking ring, with a cylindrical outer surface between the stop and the end surface of the attachment part and an inner surface having at least one internal collar. Inside the attachment part is a support ring shaped to fit the internal surface of the attachment part. The cylindrical attachment part is clamped between a stop in the pressure cylinder and a locking ring arranged in the pressure cylinder.

It is often advantageous to shape the annular end surface of the diaphragm which abuts said stop in the pressure chamber as a lip resiliently abutting the stop in the pressure chamber. The support ring has less axial length than the cylindrical attachment part and is axially fixed solely by the collar projecting into the slot in the ring. The collar is arranged immediately outside the stop for the locking ring. The collar is suitably shaped so as to have at least one slope which is conical and suitably forms an angle of approximately 45° to the axis of the cylinder.

BRIEF DESCRIPTION OF THE DRAWINGS

The invention will be described more fully in the following with reference to the accompanying drawings.
FIG. 1 shows a section through a pressure chamber and a press platen in a press for shaping sheet material by means of a diaphragm activated by pressure medium.
FIG. 2 shows the actual attachment of the diaphragm.
FIG. 3 shows the cylindrical attachment part of the diaphragm in uncompressed state.

DESCRIPTION OF THE PREFERRED EMBODIMENTS

In the drawings 1 designates a press plate, 2 a cylindrical piston and 3 a cylinder. 4 and 5 are seals and 6 a channel for the supply of pressure medium to the closed pressure chamber 7 formed by the piston 2, the cylinder 3 and the diaphragm 8. On the press platen 1 are frame dies 9 around which the sheets 10 are to be shaped into frames. The diaphragm 8 is provided with a wearing surface 11 and shaped with a substantially cylindrical attachment part 12. The diaphragm is axially fixed in the cylinder part 3 by an annular shoulder 22 in the cylinder 3 and a support (locking) ring 13 which is held in position by a holder 15 attached by bolts 14 in the cylinder 3. 16 is a substantially cylindrical support ring inside the attachment part 12 of the diaphragm. The attachment part 12 of the diaphragm 8 is shaped with an external stop 17, a lip 18, a conical surface 19 at the junction between the greater diameter $D_1$ and the smaller diameter $D_2$ and a second coniccal surface 20 at the junction between the greater diameter $D_3$ and the smaller diameter $D_2$. Between the surfaces 19 and 20, therefore, an annular collar 21 is formed. The outer surface of the support ring 16 have substantially the same shape as the inner surface of the attachment part 12 so that the collar 21 will project into a corresponding slot. In uncompressed state the attachment part 12 has such an outer diameter that it can easily be pushed into the cylinder 3 and such axial length that the measurement B in FIG. 3 is greater than the measurement A in FIG. 2. When the diaphragm is mounted, therefore, the attachment part 12 will be pressed against the stop 22 and compressed so that it fills the space between the cylinder 3 and the support ring 16 and exercises a radial pressure on this element. In this way an initial sealing pressure is obtained.

When the press is used a tension arises in the attachment part 12 nearest the diaphragm itself. Since the collar 21 projects into a slot in the support ring 16, this is drawn axially downwards and the stop 19 exercises a pressure directed substantially against the support ring 13 and the cylinder wall outside the support ring. This provides effective locking and increased sealing pressure.

The invention is of course not limited to the embodiment shown in the drawings. Many variations are feasible within the scope of invention.

What is claimed is:

1. Press for shaping sheet material by means of a diaphragm arranged in a pressure cylinder, the diaphragm being influenced by a pressure medium and shaping the sheet metal against a die member, in which the diaphragm is provided with a substantially cylindrical attachment part, the outer surface of said attachment part having a notch for a locking ring at its outer end and a substantially smooth surface between said notch and its inner end surface, said attachment part having at least one internal collar extending from its inner surface, a supporting ring completely within the attachment part having an outer surface shaped to fit the internal surface of the attachment part, said supporting ring having substantially the same axial dimension as the inner axial dimension of the attachment part, said pressure cylinder having an annular shoulder and a locking ring in said notch clamping said attachment part of the diaphragm between said locking ring and said shoulder.

References Cited

UNITED STATES PATENTS

| | | | |
|---|---|---|---|
| 2,878,767 | 3/1959 | Paulton | 72—63 |
| 3,075,485 | 1/1963 | Mitchell | 72—63 |
| 3,287,950 | 11/1966 | Grankowski | 72—63 |
| 3,334,504 | 8/1967 | Möller | 72—63 |
| 3,392,563 | 7/1968 | Möller | 72—63 |
| 3,430,473 | 3/1969 | Edwards | 72—63 |

RICHARD J. HERBST, Primary Examiner